Jan. 4, 1938. G. Z. VON MANTEUFFEL 2,104,627
STEERING DEVICE
Filed Feb. 8, 1937
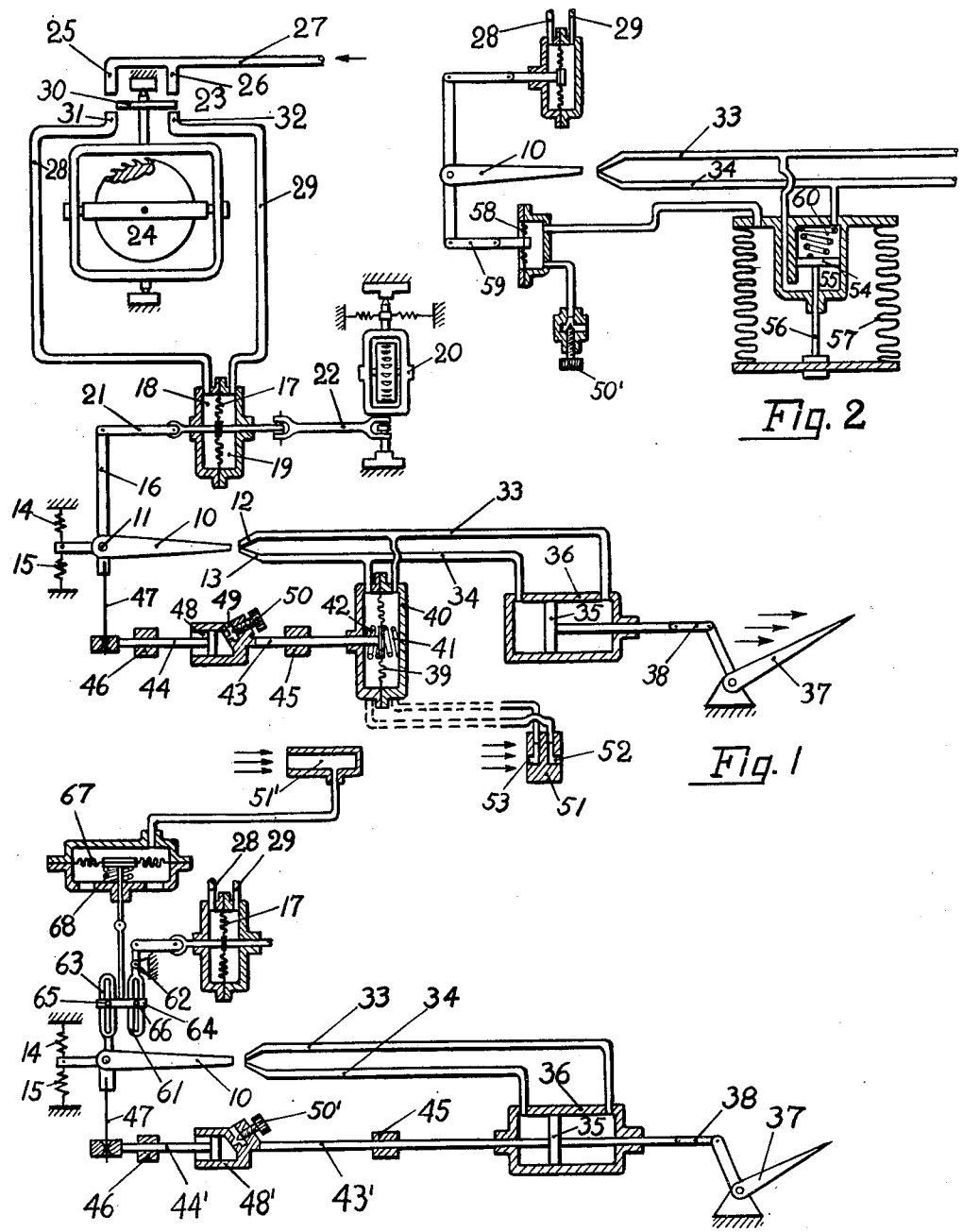
Inventor:
Gerhoege von Manteuffel.

Patented Jan. 4, 1938

2,104,627

UNITED STATES PATENT OFFICE 2,104,627

STEERING DEVICE

Gert Zoege von Manteuffel, Berlin-Dahlem, Germany, assignor to Askania-Werke A. G. vormals Centralwerkstatt Dessau und Carl Bamberg-Friedenau, a corporation of Germany Application February 8, 1937, Serial No. 124,683
In Germany February 6, 1936

13 Claims. (Cl. 244—78)

This invention relates to automatic steering devices, or automatic pilots, for craft, more particularly for craft having a relatively wide range of speed such as speed boats, aircraft, and the like.

As far as I am aware the steering devices known in the art operate on the principle of imparting the control surface, or rudder, a deflection, or angular displacement, which is proportional to the deviation of the craft from a predetermined course or attitude.

I have found that steering devices operating on this principle give satisfactory results only when used in craft having a relatively small range of speed. A steering device of the kind referred to will, for instance, give satisfactory performance at low speeds, but set up oscillations of the craft at high speeds, due to the fact, that the fast moving craft will respond more strongly to a deflection of the rudder and for this reason overshoot the predetermined course. On the other hand, the steering device adjusted for high speed steering will be too weak in action, when the craft is moving at low speeds, requiring a relatively great deflection of the rudder to effect a certain change of course or attitude.

It is therefore an object of this invention to provide a steering mechanism or automatic pilot which responds to the speed of the craft in such a way that for a given deviation of the craft from a predetermined course, or attitude, the rudder angle is made relatively great at low speeds and small at high speeds.

It is a further object of this invention to provide a steering mechanism in which the control relay is restored to the normal or zero position by an impulse derived from the speed of the craft.

Further aims, objects, and advantages will become apparent from a consideration of the detailed description which follows with the accompanying drawing illustrating embodiments of this invention. It is to be understood, however, that the description and the drawing are not to be taken in a limiting sense, the scope of the invention being defined in the appended claims.

Referring to the drawing:

Fig. 1 is a diagrammatic view disclosing one form of steering device embodying the invention.

Fig. 2 is a diagrammatic view of a modified form of steering device.

Fig. 3 is a diagrammatic illustration of another form of the invention.

In Fig. 1 a controlling relay is shown as being of the well-known "Askania" jet-pipe type. A jet-pipe 10, pivotally mounted at 11, and supplied with pressure fluid from a suitable source (not shown) issues a jet of pressure fluid into reception orifices 12 and 13 depending upon the relative position of the jet-pipe and orifices. The jet-pipe may be provided with springs 14 and 15 tending to maintain the same in the neutral position in which pressure fluid issues to an equal extent into both of the reception orifices.

The relay is acted upon by a controlling impulse derived from direction responsive instruments. For this purpose there is shown an arm 16 rigidly connected with the jet-pipe and connected by a suitable linkage 21, 22 with a diaphragm 17 separating chambers 18 and 19, and a turn indicator type gyroscope 20. The turn indicator type gyroscope is shown in plan view in the drawing. The diaphragm 17 is acted upon by a differential pressure created by a positional pick-off 23 of a directional gyroscope 24 shown in elevation. The pick-off of well known construction comprises nozzles 25 and 26 supplied with pressure fluid through a pipe 27. The jets issuing from the nozzles 25 and 26 set up a pressure differential in pipes 28 and 29, depending upon the relative position of an eccentric disk 30 and reception orifices 31 and 32.

The directional and the turn indicator type gyroscope will therefore, upon deviation of the craft from a predetermined course, exert a controlling action, or impulse, on the relay.

The actuated relay will create a pressure differential in conduits 33 and 34 connecting the reception orifices 12 and 13 with a servo-motor shown as being a piston 35 movable in a cylinder 36. The piston 35 is connected with a control surface, or rudder, 37 by a linkage 38.

It will easily be understood that the reaction of the water or air on the rudder deflected at a certain angle will be the greater, the greater the velocity of the craft. Theoretically the force of reaction increases with the square of the speed. It is therefore advantageous to vary the rudder angle proportional to the square of the speed.

A controlling influence or impulse to control the rudder deflection also from the velocity of the craft may therefore very suitably be derived from the reaction force acting on the rudder.

The reaction force is proportional to the pressure differential existing in the conduits 33 and 34 and acts on a pressure responsive device shown as being a diaphragm 39 inclosed in a casing 40, displacing the diaphragm against the action of one of the springs 41 and 42. A rod 43, 44 connected to the diaphragm will accordingly be moved in guides 45 and 46 an amount which is proportional to the square of the speed of the craft.

A restoring action is exerted on the relay in the illustrated example by means of a flat spring 47, bent according to the displacement of the rod 44.

As a restoring action I define an action tending to restore the relatively movable parts of a relay to a neutral position in which the relay is inactive. In the illustrated example of a jet-pipe relay the neutral position of the relay is that in which both reception orifices receive an equal amount of pressure fluid from the jet-pipe.

In order to further control the duration of the restoring impulse on the relay there is shown a dash pot 48 having a bleeder opening 49 adjustable by a needle valve 50.

Instead of deriving a restoring impulse for the relay from the reaction force on the rudder any other velocity responsive device may be employed.

For illustrative purposes there is shown a differential pressure device 51 having openings 52 and 53. When exposed to the action of air or water through which the craft is moving a differential pressure proportional to the velocity will be set up in the conduits leading from said openings. The conduits may be connected to the diaphragm casing 40 as indicated by the dotted connection, instead of connecting the casing with conduits 33 and 34. The force exerted by the water or air is indicated in the drawing by arrows.

The operation of the device shown in Fig. 1 is as follows. Upon deviation of the craft from the predetermined course or attitude the relay is actuated, thereby causing the servo-motor to deflect the rudder. The greater the velocity of the craft, the greater will be the restoring impulse acting on the relay and counteracting the controlling impulse. The rudder deflection will therefore be the smaller the greater the velocity. The duration of the restoring impulse may be varied at the valve 50 to meet the specific requirements of the particular type of craft.

A modified form of the invention is illustrated by Fig. 2, in which the direction responsive instruments and the servo-motor are omitted to simplify the figure.

The relay 10 is acted upon by a controlling impulse in the usual way. The differential pressure proportional to the reaction force on the rudder acts on a piston 54 movable in a cylinder 55 and connected by a rod 56 to move a bellows or sylphon 57. The pressure inside the bellows is transmitted to a pressure responsive device, shown as a diaphragm 58, restoring the relay by means of a linkage 59. For controlling the duration of the restoring impulse there may again be provided a valve 50' through which pressure fluid is admitted to or discharged from the interior of the bellows 57.

In order to straighten out a hyperbolic characteristic of the restoring impulse which may appear at impulses of long duration, there may be provided a spring 60, preferably of non-linear characteristic, to counteract a compression movement of the piston and bellows. The said hyperbolic characteristic originates in the well known law that pressure times volume are a constant. This relation is diagrammatically represented by a hyperbola.

A special feature of the device shown in Fig. 2 is the possibility of placing the rudder motor and bellows device at a point distant from the relay the only connection being three conduits of any desired length.

In the form of the invention shown in Fig. 3 a ratio varying device interposed between the direction responsive means and the rudder is used for varying the magnitude of the rudder angle in response to the velocity of the craft.

Ratio varying devices are known in the art as variable gears or lever systems. In the illustrated example there is shown a variable lever system consisting of a lever 61, pivoted at 62 and actuated by the direction responsive diaphragm 17. A second lever 63 is shown as being rigidly connected to the jet-pipe 10 for actuating the same. Both levers are operatively connected by a movable link 64 having pegs or pins 65 and 66 for engaging slots in the levers. The link is displaceable for varying the leverage by a diaphragm 67 acted upon by the dynamic pressure set up by the flowing air or water in the tube 51', representing a velocity responsive device. A spring 68 is arranged to counteract the dynamic pressure on the diaphragm. It is easily seen that the link 64 is moved downwardly upon an increase in velocity, thereby decreasing the action of the direction responsive instruments to cause a decreased deflection of the rudder.

It is, of course, possible to arrange the ratio varying device between the servo-motor and the rudder instead of between the direction responsive instruments and the relay. But the latter arrangement offers the advantage of operating the ratio varying device directly from the velocity responsive means 51' and 67 without the use of an amplifying device for the velocity impulse due to the small forces acting on the same. A ratio varying device between the servo-motor and the rudder would require relatively great forces for adjustment wherefore the illustrated arrangement is preferred.

A restoring connection is shown between the servo-motor 35, 36 and the relay 10 comprising rods 44' and 45' and a dash pot 48' for making the restoring connection yielding.

Obviously the present invention is not restricted to the particular embodiment thereof herein shown and described. Moreover it is not indispensable that all the features of the invention be used conjointly since they may be employed advantageously in various combinations and sub-combinations.

Furthermore, the invention shown as applied to a control of an airplane in azimuth may also be applied to a control about the longitudinal and lateral axes. The term "direction" is therefore used to refer to any of the three directions.

What is claimed is:

1. In an automatic pilot for craft direction responsive means; a relay connected to be actuated by said direction responsive means; and means responsive to the velocity of the craft and connected to exert a restoring action on said relay, thereby tending, upon actuation of the relay by said direction responsive means, to restore the same to neutral position.

2. In an automatic pilot for craft direction responsive means; a relay connected to be actuated by impulses from said direction responsive means; a control surface connected to be actuated by said relay; means responsive to the force exerted on the control surface and connected to act on said relay; and means for biasing said force responsive means toward its neutral position, whereby a restoring impulse is exerted on the relay which is a function of the force exerted on the control surface.

3. In an automatic pilot for craft direction responsive means; a pressure fluid relay connected to be actuated by said direction responsive means; a servo-motor controlled by said relay; means responsive to the fluid pressure acting on the servo-motor and connected to exert a restoring action on said relay; and means for biasing said pressure responsive means toward its neutral position, whereby a restoring impulse is exerted on said relay which is a function of the pressure acting on the servo-motor.

4. In an automatic pilot for craft direction responsive means; a pressure fluid relay connected to be actuated by said direction responsive means; a servo-motor controlled by said relay; a control surface actuated by said servo-motor; a pressure chamber having a movable wall acted upon by the pressure acting on the servo-motor and connected to restore the relay to its neutral position; and yielding means counteracting a movement of said movable wall relatively to said chamber to permit the same to assume a position which is a function of the servo-motor pressure.

5. In an automatic pilot for craft direction responsive means; a pressure fluid relay connected to be actuated by said direction responsive means; a servo-motor controlled by said relay; means responsive to the fluid pressure acting on the servo-motor; means for biasing said pressure responsive means toward its neutral position; and impulse transmitting means between said relay and said pressure responsive means, said transmitting means including a device for diminishing said impulse according to a function of time.

6. In an automatic pilot for craft direction responsive means; a pressure fluid relay connected to be actuated by said direction responsive means; a servo-motor controlled by said relay; a control surface actuated by said servo-motor; means responsive to the fluid pressure acting on the servo-motor and adapted to create an impulse; and a mechanical impulse transmitting connection between said relay and said pressure responsive means, said connection including a dash-pot having a bleeder hole for gradually diminishing the action of said pressure responsive means on said relay.

7. In an automatic pilot for craft direction responsive means; a pressure fluid relay connected to be actuated by said direction responsive means; a servo-motor controlled by said relay; a control surface actuated by said servo-motor; means responsive to the fluid pressure acting on the servo-motor; and a pressure fluid connection including a bellows actuated by said pressure responsive means and arranged to exert a pressure fluid impulse on said relay, thereby tending upon actuation of the relay by said direction responsive means to restore the same to neutral position.

8. In an automatic pilot for craft direction responsive means; a pressure fluid relay connected to be actuated by said direction responsive means; a servo-motor controlled by said relay; a control surface actuated by said servo-motor; a dash pot connected to act on the said relay; and means responsive to the magnitude of the fluid pressure acting on the servo-motor and connected to move said dash pot.

9. In an automatic pilot for craft direction responsive means; a pressure fluid relay connected to be actuated by said direction responsive means; a servo-motor controlled by said relay; a control surface actuated by said servo-motor; a bellows; a piston movable in a cylinder connected to be acted upon by the fluid pressure acting on said servo-motor and arranged to actuate said bellows; means responsive to the pressure inside said bellows and connected to act on the said relay; and an adjustable valve between said bellows and the atmosphere for gradually diminishing the pressure set up by the actuation of said bellows.

10. Device as set forth in claim 9 in which a spring is provided to resist a compression movement of the said bellows.

11. In an automatic pilot for craft direction responsive means; a rudder connected to be controlled by said direction responsive means; and means responsive to the velocity of the craft and operatively interposed between said direction responsive means and rudder for increasing the rudder angle upon a decrease of velocity and vice versa.

12. In an automatic pilot for craft, direction responsive means; a rudder connected to be controlled by said direction responsive means; means for varying the ratio of transmission operatively interposed between said direction responsive means and said rudder; and means responsive to the velocity of the craft and connected to adjust said variable transmission means to increase the rudder angle upon a decrease of velocity and vice versa.

13. In an automatic pilot for craft direction responsive means; a relay; means arranged to operatively connect in a variable ratio of transmission said direction responsive means to control said relay; a rudder connected to be actuated by said relay; and means responsive to the velocity of the craft and connected to adjust said variable transmission means to increase the rudder angle upon a decrease of velocity and vice versa.

GERT ZOEGE von MANTEUFFEL.